United States Patent [19]
Shoji et al.

[11] Patent Number: 4,767,245
[45] Date of Patent: Aug. 30, 1988

[54] ANNULAR HOLE CUTTER

[75] Inventors: Michihiro Shoji; Toshio Mikiya, both of Tokyo, Japan

[73] Assignee: Nitto Kohki Co., Ltd., Tokyo, Japan

[21] Appl. No.: 64,328

[22] Filed: Jun. 19, 1987

Related U.S. Application Data

[63] Continuation of Ser. No. 793,515, Oct. 31, 1985, abandoned.

[30] Foreign Application Priority Data

Nov. 1, 1984 [JP] Japan ................................. 59-229021

[51] Int. Cl.⁴ ............................................. B23B 41/02
[52] U.S. Cl. .................................... 408/204; 408/206; 408/703
[58] Field of Search .............. 408/67, 189, 191, 203.5, 408/204, 205, 206, 207, 223, 224, 230, 703

[56] References Cited

U.S. PATENT DOCUMENTS

| | | | |
|---|---|---|---|
| 3,244,035 | 9/1966 | Jehle et al. | 408/204 |
| 3,548,687 | 12/1970 | Holloway | 408/204 |
| 4,490,080 | 12/1984 | Kezran | 408/189 |

FOREIGN PATENT DOCUMENTS

| | | | |
|---|---|---|---|
| 211408 | 12/1982 | Japan | 408/204 |
| 134610 | 8/1984 | Japan | 408/204 |

Primary Examiner—Z. R. Bilinsky
Attorney, Agent, or Firm—Welsh & Katz, Ltd.

[57] ABSTRACT

An annular hole cutter is disclosed which has a plurality of cutting teeth disposed about a lower end of a cylindrical annular wall, each tooth having intersecting back-off surfaces, a first back-off surface inclining inwardly and a second back-off surface inclining outwardly. Teeth with high and wide cutting edges alternate with teeth having a low and narrow cutting edge, thereby reducing stress on the teeth, dissipating heat more effectively and preventing the blockage of the hole cutter by the cut chips.

6 Claims, 2 Drawing Sheets

ANNULAR HOLE CUTTER

This is a continuation, of application Ser. No. 793,515, filed Oct. 31, 1985 now abandoned.

TECHNICAL FIELD

This invention relates to the annular hole cutter for forming a relatively large diameter hole by cutting an annular groove in a workpiece.

BACKGROUND ART

The conventional annular hole cutter generally had cutting edges of identical configuration on its end face in which chips being cut having a width corresponding to the width of the cutting edges were discharged via the gullets and through the spiral grooves, so that as the cutting process proceeded the chips tended to block the spiral grooves, often making it impossible to continue with the cutting operation. Whenever this occurred, the cutting operation was compelled to be interrupted to remove the chips, resulting in a significant loss of efficiency.

SUMMARY OF THE INVENTION

It is an object of the present invention to solve the problems with the prior art cutter of the type described including the disadvantage that the chips may block the spiral grooves, resulting in interference with the cutting operation.

This object is accomplished by providing an annular hole cutter having a cylindrical annular wall provided with a plurality of cutting teeth spaced around the lower end thereof, said wall having a gullet and a spiral groove extending axially upwardly from the gullet on the outer side of the wall between each adjacent teeth, characterized in that the cutting edge of each of said teeth is defined by a downwardly and outwardly inclining back off surface and a downwardly and inwardly inclining back off surface intersecting each other in a V-form, said cutting edge being of generally equilateral triangular shape with the ridge line defined by the intersections between said back off surfaces intersecting at least the front face of said tooth with a central axis of said front face, said cutting teeth including high cutting teeth having back off surfaces the inclination angle of which is relatively steep and low cutting teeth having back off surfaces the inclination angle of which is relatively gentle, and high and low cutting teeth being alternately disposed.

According to this invention, a central portion of an angular groove being cut by the annular hole cutter is cut by the high cutting teeth and the remaining opposite side portions of the groove are cut by the low cutting teeth. The chips being cut by the high teeth are discharged along the spiral grooves via the gullets adjoining the high teeth while the chips being cut by the low teeth are discharged along the separate spiral grooves via the gullets adjoining the low teeth. Thus, the chips being cut by the annular hole cutter according to this invention are divided into three parts, one part equivalent to about one half of the full width of the annular groove and the other two parts each equivalent to about one-fourth of the width so that these divided wider and narrower chip parts may be separately discharged, whereby the stresses to which the cutting teeth are subjected may be reduced as much as one half of the stresses to which the prior art annular cutter would be subjected when cutting an annular groove across the full width at a stretch. In addition, dividing the chips into three parts promotes the heat dissipation and prevents the chips from blocking the spiral grooves during the cutting process.

BRIEF DESCRIPTION OF THE DRAWINGS

This and other objects and advantages of the present invention will become more apparent from the following detailed description taken with reference to the accompanying drawings, in which.

DESCRIPTION OF THE PREFERRED EMBODIMENT

Figure 1:
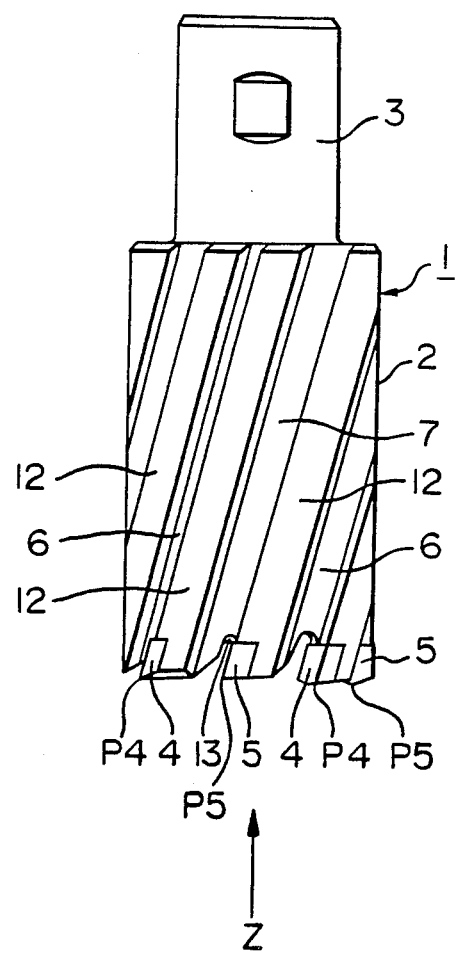
FIG. 1 is a side view of one embodiment of the annular hole cutter according to this invention.

Referring to the drawings, the annular hole cutter according to this invention comprises a main body 1 composed of a cylindrical portion 2 in the form of an inverted cup and a shank portion 3. The cup 2 has an annular relatively thin wall thickness approximately equal to the width of cutting teeth 4 and 5 which will be described in details hereinbelow.

According to this invention, a plurality of high and low cutting teeth 4 and 5, respectively are formed alternately and in circumferentially spaced relation on the lower end surface of the annular wall of the cup member 2. In this embodiment both the high and low teeth 4 and 5 are made of ultrahard steel or carbide and brazed to the lower end of the cup member 2. Formed on the outer side of the annular wall are a plurality of spiral grooves 6 and 7 having a predetermined helix angle, say, 12°.

The cutting points or high points P4 and P5 on the high and low cutting teeth 4 and 5, respectively lie on the forwardmost positions of ridge lines defined by intersections in a V-form between the downwardly and inwardly inclining back off surfaces 8 and 10 and the downwardly and outwardly inclining back off surfaces 9 and 11, respectively. Moreover, the cutting points P4 and P5 pass across the central axis A—A of the front faces of the respective cutting teeth at the respective front faces so that the front faces of the cutting teeth 4 and 5 define a generally equilateral triangle with the cutting points P4, P5 as an apex. It is because the inclination angles of the back off surfaces 8 and 10 are different from those of the associated back off surfaces 9 and 11 that the term "generally equilateral triangle" is used. That is, the inclination angles of the back off surfaces 8 and 10 are somewhat smaller than those of the associated back off surfaces 9 and 11. The included angle $\alpha$ at the cutting edge of the high tooth 4 is smaller than the included angle $\beta$ of the cutting edge of the low tooth 5. In the illustrated embodiment the angle $\alpha$ is 120° and the angle $\beta$ is 150°. The difference in height between the cutting points P4 and P5 is very small, say 0.3 mm.

In the drawings, 12 represents lands defined on the outer side of the annular wall between the spiral grooves, and 13 represents gullets formed between the successive cutting teeth.

Operation

The shank portion 3 is secured to the arbor of an electrically powered drill (not shown). As the drill is lowered with the annular hole cutter rotating, an annular groove is formed in a workpiece as will be described below.

First, the high teeth 4 cut a groove shallow in the workpiece with the central cutting edge portions X of the teeth width, followed by the trailing low teeth 5 cutting the opposite side portions of the groove cut shallow by the central portions X of the leading high teeth 4 with the opposite lateral cutting edge portions y of the low teeth 5, whereby the full width of the groove is cut in three divisions. The low teeth 5 do not engage with and do not perform the cutting operation on that central portion of the groove which has been cut by the high teeth 4. The cutting operations by the alternating high and low teeth are thus continuously and repeatedly carried out as the annular cutter continues to rotate.

In the embodiment illustrated herein the cutting teeth 4 and 5 are formed of ultrahard steel separately from the cylindrical portion 2. It is to be understood, however, that the teeth may be formed integral with the lower end surface of the cylindrical portion 2.

Figure 2:
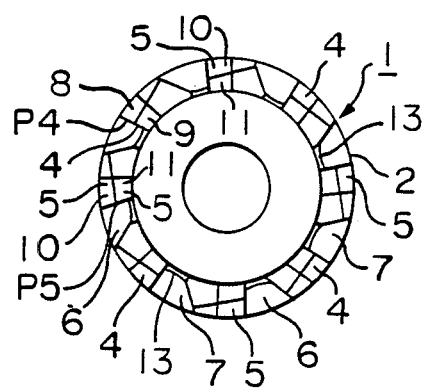
FIG. 2 is a bottom plan view of the cutter of FIG. 1 as viewed in the direction of the arrow Z.
Figure 3:
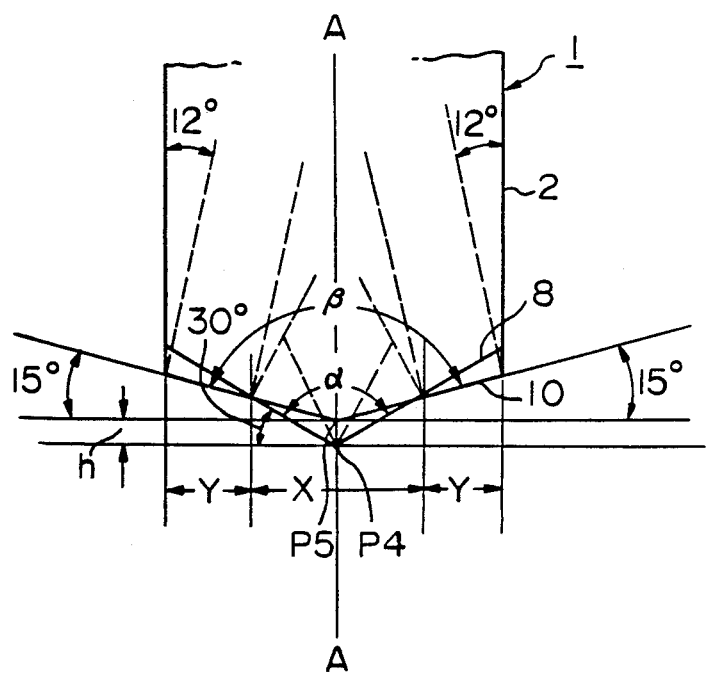
FIG. 3 is a schematic view illustrating the high and low cutting teeth in stacked relation to show the differences in height and angle of the angular cutting edges.

The directions of the ridge lines defined by the intersecting inclined back off surfaces 8 and 9 (10 and 11) may be offset to the left or to the right with respect to the reference line A—A passing through the cutting points P4 and P5 on the bisector of the cutting teeth width. The ridge lines may also be in coincidence with the reference line A—A. In the embodiment shown in FIG. 2 the ridge lines are offset to the left.

Advantages of the Invention

The annular hole cutter according to this invention is characterized by high and low cutting teeth alternately provided on the lower end surface of the annular wall of the cup member of the cutter, said high and low teeth having different included angles formed by the intersecting inner and outer inclined back off surfaces, whereby a central portion of the annular groove being cut by the cutter may be cut by the high teeth while the opposite side portions of the groove may be separately cut by the low teeth.

As is opposed to the prior art annular hole cutter designed to cut a groove across the full width at a stretch, the chips produced in cutting an annular groove according to this invention are divided into three by the high and low teeth, and the divided chips are separately discharged along the respective spiral grooves. Consequently, the cutting stress is reduced from one half to one-fourth, and the heat dissipation during the cutting process is also promoted. The possibility is thus eliminated that chips may block the spiral grooves, resulting in interference with the cutting operation and hence the interruption of the operation, as was often the case with the prior art annular cutter.

What is claimed is:

1. An annular hole cutter having a cylindrical annular wall provided with a plurality of cutting teeth spaced around the lower end thereof, said wall having a gullet and a spiral groove extending axially upwardly from the gullet on the outer side of the wall between each adjacent teeth, characterized in that the cutting edge of each of said teeth is defined by a downwardly and outwardly inclining back off surface and a downwardly and inwardly inclining back off surface intersecting each other in a V-form, said cutting edge being of generally equilateral triangle with the ridge line defined by the intersections between said back off surfaces intersecting at least the front face of said tooth with a central axis of said front face, said cutting teeth including high cutting teeth having back off surfaces the inclination angle of which is relatively steep and low cutting teeth having back off surfaces the inclination angle of which is relatively gentle, and high and low cutting teeth being alternately disposed.

2. An annular hole cutter having a cylindrical annular wall having four or more cutting teeth spaced around an axial end annular surface of the wall, said wall having a gullet and spiral groove extending axially upwardly from the gullet on the outer peripheral surface of the wall between each adjacent teeth, said teeth being defined by a first downwardly and radially outwardly inclining back-off surface and a second downwardly and radially inwardly inclining back-off surface intersecting each other to form an apex, said cutting edge of each cutting tooth being a generally equilateral triangle having a ridge line defined by the intersections between said first and second back-off surfaces intersecting at least the front face of said tooth with a vertical central line of said front face, said cutting teeth including high cutting teeth having back off surfaces the inclination angle of which is relatively steep, and low cutting teeth having back-off surfaces the inclination angle of which is relatively gentle, and said high and low cutting teeth being alternately disposed said axial end annular surface of said wall.

3. The annular hole cutter of claim 2 wherein said adjacent teeth are offset approximately 0.3 mm.

4. The annular hole cutter of claim 2 wherein the combined cutting action of said high cutting teeth and said low cutting teeth results in the division of chips into substantially three parts.

5. The annular hole cutter of claim 4 wherein said height cutting teeth have back-off surfaces with an inclination angle of 15° and said low cutting teeth have back-off surfaces with an inclination angle of 30°.

6. An annular hole cutter having a cylindrical annular wall having four or more cutting teeth spaced around an axial end annular surface of the wall, said wall having a gullet and spiral groove extending axially upwardly from the gullet on the outer peripheral surface of the way between each adjacent teeth, said teeth being defined by a first downwardly and radially outwardly inclining back-off surface and a second downwardly and radially inwardly inclining back-off surface intersecting each other to form an apex, each of said apexes being equidistant from a center axis, said cutting edge of each cutting tooth being a generally equilateral triangle having a ridge line defined by the intersections between said first and second back-off surfaces intersecting at least the front face of said tooth with a vertical central line of said front face, said cutting teeth including high cutting teeth having back-off surfaces the inclination angle of which is relatively steep and low cutting teeth having back-off surfaces the inclination angle of which is relatively gentle, and said high and low cutting teeth being alternately disposed around said axial end annular surface of said wall.

* * * * *